United States Patent [19]

Magnussen, Jr. et al.

[11] Patent Number: 4,748,859

[45] Date of Patent: Jun. 7, 1988

[54] DISPOSABLE PIPETTE TIP

[75] Inventors: Haakon T. Magnussen, Jr., Orinda; Walter S. Watson, San Leandro, both of Calif.

[73] Assignee: Rainin Instrument Co., Inc., Emeryville, Calif.

[21] Appl. No.: 22,798

[22] Filed: Mar. 6, 1987

[51] Int. Cl.[4] .................. G01N 1/14

[52] U.S. Cl. .................. 73/864.01; 73/864.14

[58] Field of Search .................. 73/864.01, 864.14

[56] References Cited

U.S. PATENT DOCUMENTS

| | | | |
|---|---|---|---|
| 1,634,183 | 6/1927 | Gervais et al. | 73/864.01 |
| 3,732,734 | 5/1973 | Avakian | 73/864.14 |
| 4,072,330 | 2/1978 | Brysch | 73/864.14 |
| 4,362,064 | 12/1982 | d'Autry | 73/864.14 X |
| 4,679,446 | 7/1987 | Sheehan et al. | 73/864.14 X |

FOREIGN PATENT DOCUMENTS

| | | | |
|---|---|---|---|
| SC13272 | 5/1956 | Fed. Rep. of Germany | 73/864.01 |

*Primary Examiner*—Tom Noland

*Attorney, Agent, or Firm*—Robert R. Meads

[57] ABSTRACT

A disposable pipette tip member having three inner coaxial annular sealing bands spaced axially from an open proximal end for receiving a conical pipette tip mounting shaft. The first two sealing bands and adjacent valley regions of the tip member are relatively resilient and are shaped such that the two sealing bands simultaneously engage, guide and laterally support the pipette shaft as it enters the tip member to form annular fluid-tight seals with the shaft. The third band is relatively rigid and upon engagement with the shaft, forms a third annular fluid-tight seal and a controllable stop for the shaft such that the tip member is seated on the shaft adjacent the pipette tip ejector mechanism.

9 Claims, 2 Drawing Sheets

DISPOSABLE PIPETTE TIP

BACKGROUND OF INVENTION

The present invention relates to an improved disposable tip member for single and multiple channel pipette devices.

The use of pipette devices for the transfer and dispensing of precise quantities of fluids in analytical systems is well known as is the use of disposable tip members for such pipettes. Disposable tips accommodate the serial use of such pipette devices in the transfer of different fluids without carryover or contamination.

Generally speaking, disposable tip members are formed of a plastic and are of an elongated conical shape with an open proximal end for receiving and releasably mating with the distal end of the pipette's conical tip mounting shaft. Ideally, the disposable tip member should slide easily onto the pipette shaft to an axial position adjacent the pipette's tip ejection mechanism. Thus located, the tip member should be stable on the shaft, free from external rocking relative to the shaft (as during "tipping off"), and form a fluid tight annular seal with the pipette shaft.

Unfortunately, in practice, the ideal is rarely achieved without the exercise of special care and effort by the pipette operator in mounting the tip member on the pipette shaft. Commonly, disposable pipette tip members have a tendency to become loose with use, either destroying the necessary fluid seal with the shaft upon which it is mounted or falling off when subjected to side load forces as during "tipping off". To counteract such tendencies, pipette operators commonly force the tip member so far onto the pipette shaft that it becomes nearly impossible to remove or jams into the tip eject mechanism. At the very least, the variability of the insertion forces applied by a pipette operator in mounting flexible tip members on a pipette shaft usually results in the tip members being mounted in different axial positions during successive fluid transfer operations producing small quantitative variations in the fluids dispensed by the pipette.

The foregoing problems associated with the proper mounting of disposable pipette tip members are compounded with multichannel pipettes including several parallel shafts. Disposable pipette tips are commonly stored in sterilizable plastic boxes or racks where they are vertically oriented with their open proximal ends exposed. The multichannel pipette is placed over the rack with the several shafts thereof aligned with the open tips. After a slight initial insertion into the aligned tip members, a relatively large downward force is exerted on the pipette to drive the pipette shafts into the tip members. As the pipette shafts engage the tip members, such large downward forces are exerted on the tip members and transferred to the top of the rack causing it to bow and the tip members supported thereon to move with the now curved top of the rack. Under such conditions, the outermost tip members fully receive the pipette shafts while the innermost tip members do not. Such tip members often are not adequately seated on their corresponding pipette shafts and require separate manual pushing onto the corresponding shafts to create the desired fluid tight seals. Otherwise, such tips often fall off the shafts with pipette movement or dislodge with "tipping off."

The aforementioned problems associated with disposable pipette tips are common in varying degrees to all prior tip designs. One such tip design includes a smooth conical inner surface adjacent the open proximal end thereof. The axial taper of the inner surface is greater than the axial taper of the pipette shaft such that upon insertion, an annular end portion of the shaft engages an annular inclined inner surface of the tip member near the open end. Because such tip members are rather rigid, relative movement between the shaft and tip member stops almost immediately upon shaft engagement with the tip member resulting in a rather unstable annular seal and a tip member that is subject to rocking and dislodgement in response to lateral forces. These problems are particularly apparent when such tip members, mounted on deformable racks, are applied to multichannel pipettes. In particular, when such rigid tip members, mounted in a multi-pipette rack, are engaged by the multiple parallel shafts of a multichannel pipette, the tip members will seat on their associated shafts, canted relative to the shaft if the tip members are out of axial alignment with their associated shaft. This is because the tip members are too rigid to compensate for non-parallelism of the tip members mounted on the rack. Further, as such tip members are engaged by the multiple shafts, the downward forces cause the rack top to bow, resulting in the aforementioned non-uniform axial seating of tip members on the shafts or the non-seating of tip members on the inner ones of the shafts of the multichannel pipette. The problems of axial canting, unstable and uneven axial seating and/or loose central seating of tip members is common relative to all rigid tip members applied to multichannel pipettes. This is to be distinguished from the problems associated with prior flexible tip members. While some such tip members may be sufficiently flexible to compensate for non-parallelism of rack supported tip members, they easily receive the multiple shafts and seat at different axial locations on their associated shafts. This is due to the bowing of the rack top in response to the downward shaft insertion forces applied to the tip members and results in the aforementioned undesirable quantitative variations in fluids dispensed by several channels of the multichannel pipette. Further, such flexible tip members are subject to the aforementioned undesirable jamming into the tip ejection mechanisms of the multichannel pipettes in response to excessive axial forces, as may be applied to the outermost rack supported tip members during an attempt to properly seat the innermost tip members on a multichannel pipette.

Other tip designs include a single internal sealing band or crush ring adjacent the open proximal end of the tip member. Such tip members provide little if any axial guiding for the associated pipette shaft during insertion and are subject to the aforementioned problems of lateral instability. This is particularly true for tip members incorporating a crush ring. Such rings are permanently deformed as the pipette shaft is inserted into the associated tip member and do not possess the resilience necessary to accomodate any lateral tip movement on the shaft in response to external lateral forces commonly applied to tip members during use.

Still other tip members incorporate multiple internal sealing bands or crush rings. In practice, the walls of such tip members are usually so rigid that the tip members are subject to the aforementioned problems particularly associated with the application of rigid tip members to multichannel pipettes.

Commercially available pipette tip members having one or more of the foregoing shortcomings and/or characteristics are the Types RC20 and RC200 manufactured by Rainin Instrument Co., Inc. of Woburn, MA; Types C20 and C200 manufactured by Gilson Medical of Villiers Le Bel, France; Types 26, 28, 35, 37 and 40 manufactured by Bio Rad Laboratories of Richmond, CA; R-1035 BR manufactured by West Coast Scientific, Inc. of Emeryville, CA; Titertek® tips, Finntip and Finntip 60 manufactured by Labsystems OY of Helsinki, Finland; Types 9025 and 9026 manufactured by Medical Laboratory Automation, Inc. of Mount Vernon, NY; the Oxford® Types 810 and 911 manufactured by Sherwood Medical of St Louis, MO; Type P1100 distributed by Denville Scientific Inc. of Denville, NJ; Reference Tip® manufactured by Bio-Plas of San Francisco, CA; and ProPet tips manufactured by Cetus of Emeryville, CA; Eppendorf Flextip manufactured by Brinkmann Instruments Co. of Westbury, NY. Still others are described or referenced in U.S. Pat. No. 4,072,330.

SUMMARY OF INVENTION

The present invention overcomes the shortcomings and problems of prior disposable pipette tips by providing a tip design having two internal resilient coaxial annular sealing bands adjacent the open proximal end of an elongated receptacle comprising the tip member. The two sealing bands are configured as to axial spacing, taper and diameter to simultaneously engage and make sliding contact with corresponding sealing zones on a pipette shaft to provide initial axial guiding and lateral support for the shaft as it is introduced into the receptacle. The sealing bands are further configured relative to adjacent annular valley areas on the inner surface of the receptacle such that further movement of the shaft into the receptacle produces a slight lateral deformation of the sealing bands and receptacle to create two axially spaced fluid tight annular seals between the shaft and the receptacle. While the shaft is thus further moved into the receptacle, a distal end portion thereof engages an annular stop and sealing surface on the inner surface of the receptacle. The annular stop preferably is more rigid than the sealing bands so as to resist and halt further relative movement between the shaft and receptacle and to define a third annular fluid tight seal between the shaft and the receptacle. The stopping location for the shaft in the receptacle is thus controlled to be a proper distance from the pipette's tip ejection mechanism.

DETAILED DESCRIPTION OF INVENTION

Figure 1:
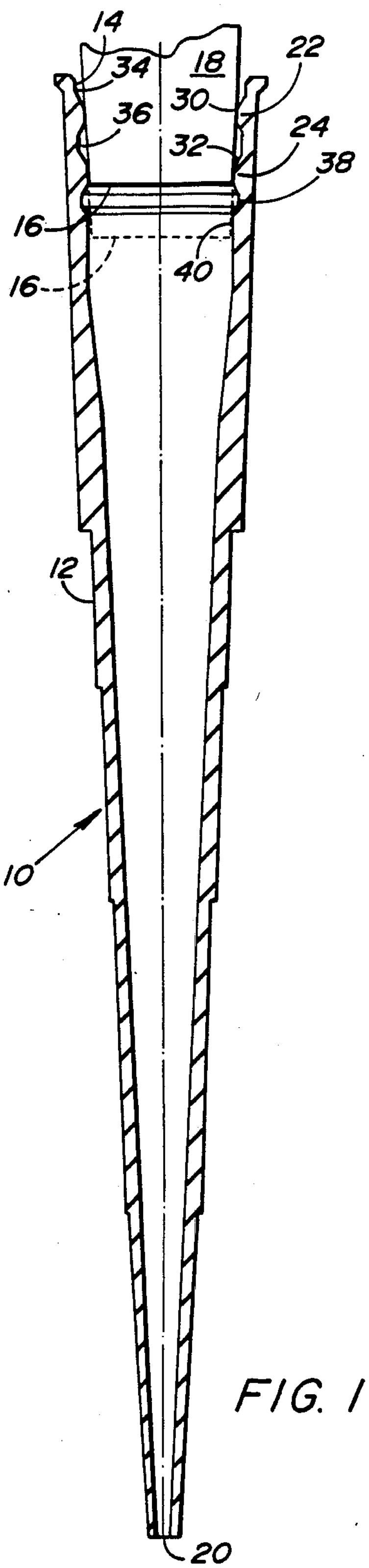
FIG. 1 is a cross-section view of a disposable pipette tip member in accordance with the present invention and showing a pipette shaft inserted in an open proximal end of the tip member. The pipette shaft is shown in solid outline as it is initially inserted into the tip member to simultaneously engage two axially spaced annular sealing bands for axially guiding and laterally supporting the shaft as it moves into the tip member. The pipette shaft is shown in phantom outline as it is finally seated in the tip member with a distal end portion in sealing engagement with an annular stop in the tip member.

In FIG. 1, a preferred form of tip member is represented by numeral 10 and comprises an elongated tubular receptacle 12 having a relatively large proximal opening 14 for axially receiving a distal end 16 of a pipette mounting shaft 18. The receptacle is formed of a plastic material and is generally conical in shape having a relatively small distal tip opening 20 for dispensing fluid from the tip member.

Figure 2:
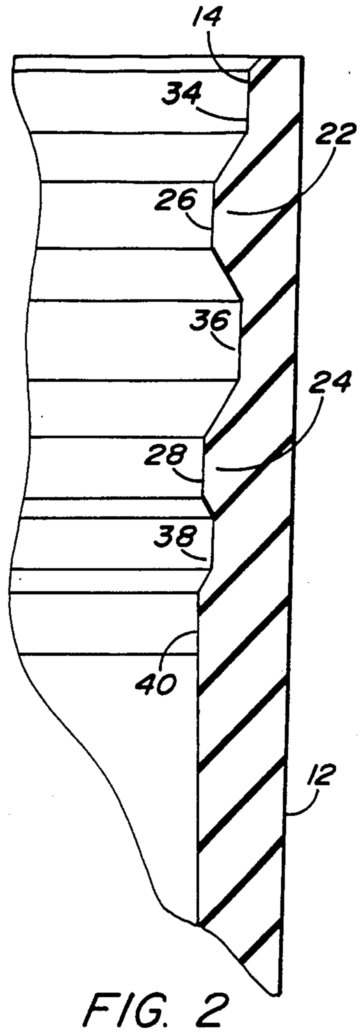
FIG. 2 is an enlarged axial fragmentary sectional view of the tip member of FIG. 1 showing in solid line the sealing and stop bands of the tip member and in dotted line the tip member as it deforms upon insertion of a pipette shaft.

As illustrated most clearly in FIG. 2, the inner surface of the receptacle 12 adjacent the proximal opening 14 carries two annular sealing bands 22 and 24 coaxial with the receptacle. The sealing bands 22 and 24 are of frustoconical axial cross-section and are formed of the plastic material forming the receptacle. The sealing bands are axially separated along the axis of the receptacle and include flat inner annular surfaces 26 and 28 having diameters and axial tapers corresponding substantially to the axial spacing and outer diameters and axial tapers of corresponding annular sealing zones 30 and 32 on an outer axial surface of the shaft 18. Preferably, the shaft 18 is frustoconical in shape having a smooth outer surface with a uniform axial taper of about 3° 30′ to the axis of the shaft. Under such conditions, the inner annular surfaces 26 and 28 of the sealing bands 22 and 24 have a like axial taper of 3° 30′ such that the sealing bands make simultaneous sliding contact with the corresponding annular sealing zones 30 and 32 as the shaft 18 is moved into the receptacle. Such spaced, two location annular contact between the sealing bands and the shaft provides initial axial guiding and lateral support for the shaft as it moves into the receptacle.

As may be noted from a viewing of FIG. 1, the receptacle 12 has wall thicknesses of different dimension in different axial regions to define annular areas of different lateral flexibility and resilience. This is an important feature of the present invention. By proper dimensioning and control of wall thicknesses, the resulting tip member will easily and smoothly receive a pipette shaft to a location a controlled distance from the pipette's tip ejection mechanism. There, the tip member is axially and laterally stable on the shaft, free from lateral rocking relative to the shaft during use of the pipette—forming a plurality of fluid tight annular seals with the shaft until it is desired to remove the tip member by normal operation of the tip ejection mechanism. Such a controlled mountability of a tip member is particularly important with regard to multichannel pipettes and in practice has been found to overcome previously described mounting problems associated with multichannel pipettes.

More particularly, in the preferred form of the tip member 10, the wall thickness of the receptacle 12 in the axial regions of the sealing bands 22 and 24 is less than one-sixth the inner diameter of the bands and greater than in the immediately adjacent region where the inner diameter of the receptacle is increased to define inner annular valleys 34,36 and 38 of reduced wall thickness and increased flexibility between and immediately adjacent the sealing bands 22 and 24. Further, the valley 34 is open to the proximal opening 14 to loosely receive the distal end 16 of the pipette shaft 18. The axial length of the valley 36 is more than twice the axial width of each sealing band 26 and 28. Because of the flexibility and resilience of the receptacle 12 in the axial regions of the valleys, as the shaft 18 moves into the receptacle to simultaneously engage and make sliding contact with the sealing bands 26 and 28, the bands while providing axially guiding and lateral support for the shaft 18, flatten and expand slightly into the regions of the valleys which bow outwardly to accommodate such expansion with continued movement of the shaft into the receptacle. Further, as illustrated most clearly in FIG. 2, the axial dimensions of the sealing bands are substantially less than the diameter of the bands whereby forces opposing movement of the pipette shaft into the receptacle are concentrated on relatively small annular sealing surfaces to create enhanced fluid tight sealing pressures. Still further, in order to enhance the desired resilience and flexibility of the sealing bands and valleys, the valleys have sidewalls of gradually increasing wall thickness terminating adjacent the sealing bands and the inner surface of the receptacle to define filets between floors of the valleys and the frustoconical surfaces of the sealing bands.

Figure 3:
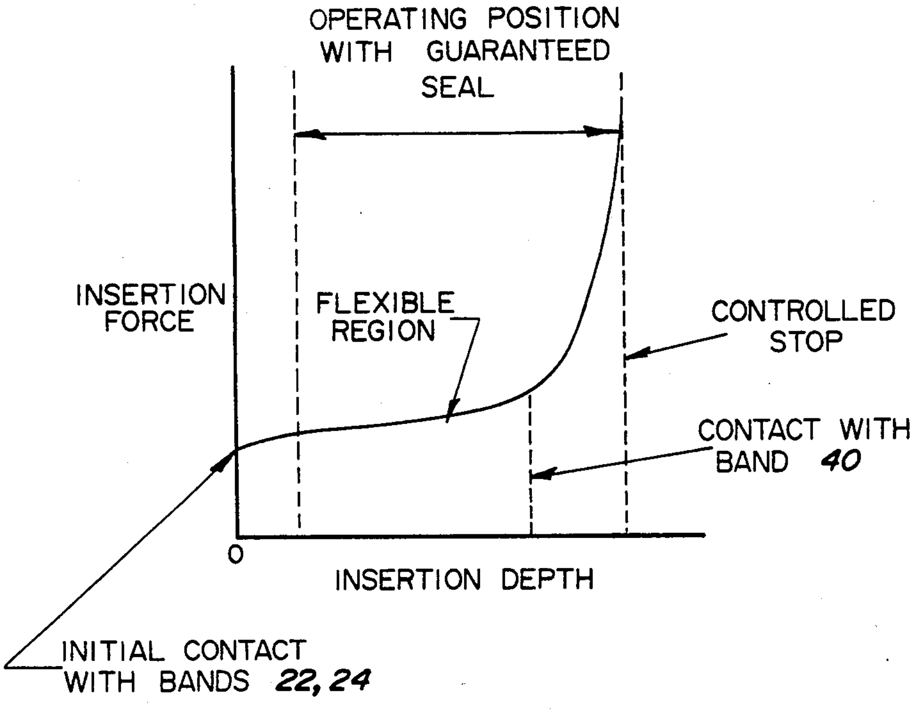
FIG. 3 is a graph of the insertion force required to move a pipette shaft into the pipette tip member of FIG. 1 as a function of insertion depth into the tip member.

As to the required shaft insertion forces, FIG. 3 depicts the relationship between the force required tpo move the shaft 18 into the receptacle 12 after initial contact is made with the sealing bands 22 and 24. The insertion depth of the shaft 18 depicted by the "flexible region" represents the insertion force-depth relationship as the shaft slides over the sealing bands with an expansion of the bands and valleys to engage an annular seal and stop surface 40 on the inner surface of the receptacle beyond the sealing bands.

As illustrated most clearly in FIG. 2, the distal edge of the valley 38 returns to the line of axial taper of the inner surface of the receptacle, namely 3° 30'. Thus, while the shaft 18 is simultaneously guided and supported by the sealing bands 22 and 24, it engages the inner surface of the receptacle when the distal end 16 passes beyond the valley 38 (See FIG. 1). There, the wall thickness increases and the inner surface of the receptacle defines the annular seal and stop surface 40. Because of the increased wall thickness at the surface 40, the receptacle is rigid in the region of the surface 40 relative to the sealing bands 22 and 24. As represented in FIG. 3, because of such rigidity, as the distal end of the shaft 18 engages and slides smoothly on the surface 40, the forces opposing further axial sliding movement of the shaft significantly increase. While the shaft moves slightly forward after initial contact with the surface 40 to create a third fluid tight annular seal, movement of the shaft is quickly halted such that the surface 40 defines a controlled stop for the shaft. Preferably, the axial spacing of the stop within the receptacle is dimensioned relative to the associated pipette, such that the tip member 10 comes to a halt with the proximal end 14 immediately adjacent the tip ejection mechanism of the pipette ready for reliable ejection of the tip member following use of the pipette and tip member.

Thus, by providing a tip member with two axially spaced annular resilient and flexible sealing bands adjacent the tip open end, dimensioned and tapered to simultaneously engage, guide and laterally support the pipette shaft, in combination with a relatively rigid third annular seal and stop band spaced inwardly of the sealing bands to provide a third annular seal and controlled stop for the shaft, the present invention overcomes the lateral instability and non-uniform mounting characteristics of prior tip members particularly associated with tip members applied to multichannel pipettes. In particular, because of the resilience and flexibility of the receptacle in the regions of the two sealing bands, the receptacle is capable of compensating for non-parallelism of rack-supported tip members by providing simultaneous two annular location axial guiding and sealing on the bands 22 and 24 without producing significant bowing of the rack top, while the controlled stop provided by the third seal and stop band substantially eliminates the problems of non-uniform axial seating of rack supported tips on shafts of multi-channel pipettes.

A particular tip member possessing such characteristics and designed for use with the EDP-M8 and Pipetteman Model P-200 pipettes marketed by Rainin Instrument Company, Inc., Emeryville, Calif., is formed of polypropylene and has the following approximate dimensions:

| | |
|---|---|
| Overall length | 1.986" |
| Inner diameter of opening 14 | .233" |
| Outer diameter at end 14 | .287" |
| Inner diameter of band 22 | .209" |
| Wall thickness of band 22 | .027" |
| Axial length of band 22 | .020" |
| Axial length of valley 36 | .060" |
| Inner diameter of valley 36 | .223" |
| Wall thickness of valley 36 | .019" |
| Inner diameter of band 24 | .199" |
| Wall thickness of band 24 | .027" |
| Axial length of band 24 | .020" |
| Inner diameter of valley 38 | .207" |
| Wall thickness of valley 38 | .023" |
| Axial distance between valley 38 and band 40 | .03" |
| Inner diameter at band 40 | .198" |
| Wall thickness at band 40 | .028" |

While a particular tip member has been illustrated and described herein, the present invention shall be limited in scope only by the following claims.

We claim:

1. A removable tip member for releasably mating with an elongated generally conical mounting shaft of a pipette, comprising:

an elongated tubular receptacle having a relatively large proximal opening for receiving a distal end of the shaft and a relatively small distal tip opening for picking up and dispensing fluid from the tip member;

first and second annular, coaxial, frustoconical in axial cross-section, resilient sealing bands on an inner surface of the receptacle adjacent the proximal opening, the sealing bands having axially extending sealing surfaces axially separated from each other and having inner diameters and axial tapers corresponding substantially to an axial spacing and outer diameters and axial tapers of corresponding annular sealing zones on an outer surface of the shaft such that the sealing bands make simultaneous sliding contact with the sealing zones as the shaft is moved into the receptacle to provide initial axial guiding and lateral support for the shaft and such that further movement of the shaft into the receptacle produces a slight outward lateral deformation of the sealing bands and adjacent portions of the receptacle to create first and second axially spaced fluid tight annular seals between the shaft and the receptacle; and an axially extending annular stop and sealing surface on an inner surface of the receptacle beyond the sealing bands for engaging an axially extending outer annular sealing surface on the shaft as the shaft is further moved into the receptacle to halt such further relative movement and to define a third annular fluid tight seal between the shaft and the receptacle.

2. The tip member of claim 1, wherein:

the annular stop and sealing surface is more rigid than the sealing bands.

3. The tip member of claim 1, wherein:

the axial dimensions of the sealing bands are substantially less than the diameter of the bands whereby forces opposing movement of the pipette shaft into the receptacle are concentrated on relatively small annular sealing surfaces to create enhanced fluid tight sealing pressures.

4. The tip member of claim 1, wherein:

the repectacle is formed of a plastic material having wall thicknesses of different dimensions in different axial regions of the receptacle, the wall thickness in the axial regions of the sealing bands being less than one-sixth the diameter of the bands and greater than in immediately adjacent axial regions where the inner diameter of the receptacle is increased to define inner annular valleys of reduced wall thickness and increased flexibility between and immediately adjacent the sealing bands to accommodate lateral deformation of the sealing bands and valleys as the shaft is moved into the receptacle and engages the sealing bands.

5. The tip member of claim 4, wherein:

the valley between the sealing bands has an axial dimension more than twice the axial dimension of each sealing band.

6. The tip member of claim 4, wherein:

the stop and sealing surface is supported by a relatively thick wall section defining a stop band inflexible relative to the sealing bands.

7. The tip member of claim 6 wherein:

the valleys have sidewalls of gradually increasing wall thickness terminating at adjacent sealing bands and the inner surface of the receptacle to define filets between floors of the valleys and the frustoconical surfaces of the sealing bands.

8. A removable tip member for releasably mating with an elongated generally conical mounting shaft of a pipette, comprising:

an elongated tubular receptacle having a relatively large proximal opening for receiving a distal end of the shaft and a relatively small distal tip opening for dispensing fluid from the tip member and a plurality of resilient, axially extending, annular, coaxial and axially spaced sealing bands on and coaxial with an inner surface of the receptacle near the proximal opening for axially receiving and making sliding annular fluid-tight sealing contact with the pipette shaft as it moves inward into the receptacle, a one of the sealing bands being more rigid than others of the bands to resist inward sliding movement of the pipette shaft and to form a controlled stop for the shaft with the proximal opening halting a controlled distance from a tip ejection mechanism of the pipette.

9. The tip member of claim 8 wherein:

the one sealing band is an inwardmost one of the sealing bands and at least two other of the sealing bands are dimensioned as to axial spacing diameter and taper so as to simultaneously engage and axially guide and laterally support the shaft as it moves axially into the receptacle.

* * * * *